Figure 1:
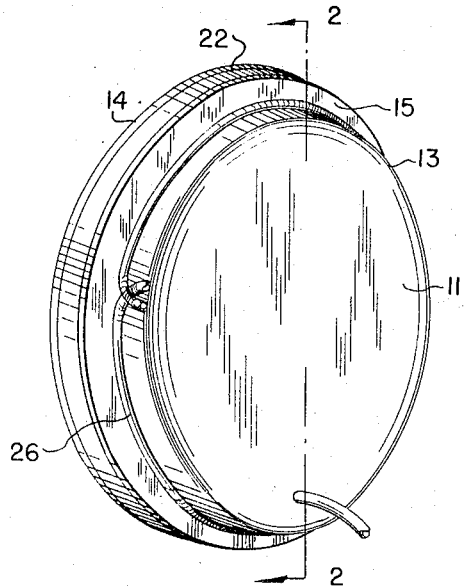

Jan. 23, 1968    E. L. THELLMANN    3,365,334
FUEL CELL HAVING A SEAL OF SOLIDIFIED ELECTROLYTE
AT THE PERIPHERY OF ELECTROLYTE CHAMBER
Filed May 23, 1963

INVENTOR.
EDWARD L. THELLMANN
BY
William J. Flynn
ATTORNEY

United States Patent Office 3,365,334
Patented Jan. 23, 1968

3,365,334
FUEL CELL HAVING A SEAL OF SOLIDIFIED ELECTROLYTE AT THE PERIPHERY OF ELECTROLYTE CHAMBER
Edward L. Thellmann, Parma, Ohio, assignor to Clevite Corporation, a corporation of Ohio
Filed May 23, 1963, Ser. No. 282,689
4 Claims. (Cl. 136—86)

This invention relates to a liquid electrolyte fuel cell having an improved seal for the electrolyte chamber.

Fuel cells of the type to which the present invention is directed are electrochemical devices for the direct conversion of fuel energy into electrical energy. A gaseous fuel, which typically may contain hydrogen or carbon, or both, is supplied to one electrode of the fuel cell. Oxygen or air is supplied to the other electrode. A liquid electrolyte, which may be an aqueous solution of potassium hydroxide, potassium chloride, or sodium chloride, for example, is contained between the electrodes in the fuel cell. The charge resulting from the reduction of oxygen at the oxygen electrode is transferred through the electrolyte to the fuel electrode where, as a result of oxidation of hydrogen and/or carbon, electrons are released to the external electrical circuit and water and/or carbon dioxide is produced.

Serious difficulty has been encountered heretofore in providing an effective liquid-tight seal around the periphery of the electrolyte chamber in such fuel cells. The temperature of the electrolyte often exceeds 400° F. when the fuel cell is in operation, and at these temperatures conventional sealing or gasketing materials tend to deform or deteriorate and permit leakage of the electrolyte. For example, tetrafluoroethylene (sold under the name "Teflon") has been used as a gasket material for fuel cells operating at temperatures up to about 500° F. However, at temperatures near 500° F. this material tends to flow, and to compensate for this it has been necessary to provide elaborate clamping devices to prevent leakage past the gasketing. At temperatures substantially above 500° F., tetrafluoroethylene is not suitable at all for this purpose.

The present invention is directed to a novel arrangement which overcomes these difficulties in an advantageous manner. In accordance with the present invention, a cooling arrangement is provided for freezing the electrolyte around the periphery of the electrolyte chamber in the fuel cell, the solidified electrolyte region itself constituting the primary seal preventing leakage of the liquid electrolyte from the electrolyte chamber. Preferably, this cooling arrangement is constituted by cooling tubes attached to the fuel cell around the periphery of the electrolyte chamber. Preferably, also, a conventional gasket is provided to serve as a secondary or back-up seal for the primary seal constituted by the frozen electrolyte region.

It is the principal object of this invention to provide a novel and improved arrangement for sealing the electrolyte chamber of a liquid electrolyte fuel cell.

It is also an object of this invention to provide such a sealing arrangement which prevents leakage of the electrolyte, even at high temperatures.

Another object of this invention is to provide such a sealing arrangement which is not subject to distortion or deterioration, particularly at higher temperatures, and which prevents leakage without requiring elaborate clamping devices.

Another object of this invention is to provide such a sealing arrangement which maintains the conventional gasket at a reduced temperature, extending the life of the gasket and preventing contamination of the electrolyte by deterioration of the gasket material.

Another object of this invention is to provide such a sealing arrangement which provides an effective electrical insulation seal between the fuel cell electrodes at the periphery of the electrolyte chamber.

Another object of this invention is to provide such a sealing arrangement which extends the operating temperature and the size of the fuel cells on which it is used.

Further objects and advantages of this invention will be apparent from the following detailed description of a presently-preferred embodiment, which is shown in the accompanying drawing.

Figure 2:
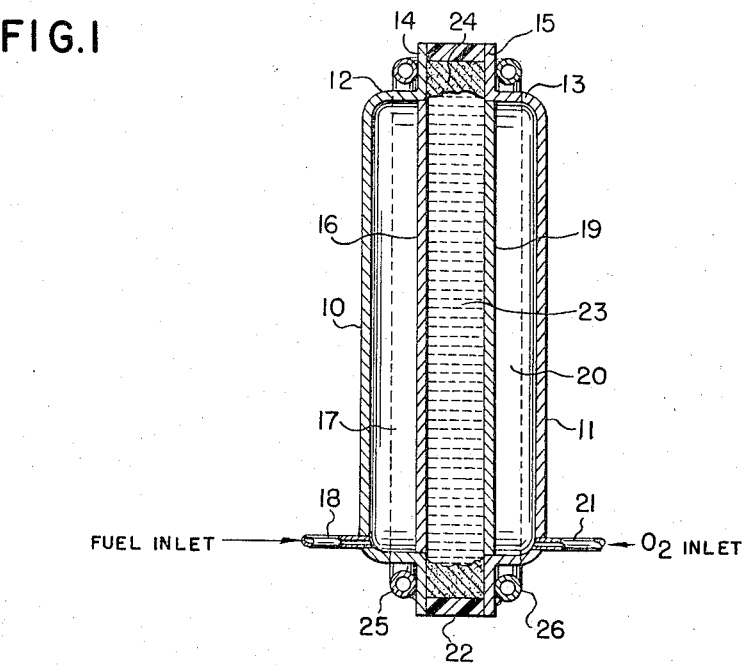

In the drawing:
FIGURE 1 is a perspective view of a fuel cell embodying the present invention; and
FIGURE 2 is a section taken along the line 2—2 in FIGURE 1.

Referring to the drawing, the fuel cell includes a housing constituted by a pair of dished opposite plates 10 and 11 having integral, annular, turned-in skirt portions 12 and 13 extending toward one another and terminating in flat, annular, marginal flanges 14 and 15 which extend in spaced, parallel relationship to one another.

A first porous electrode plate 16, which may be of sintered nickel powder, is supported by the housing plate 10 at the inside of the latter's marginal flange 14. The housing plate 10 and electrode plate 16 together define a fuel chamber 17 at the outside face of this electrode plate for receiving a suitable gaseous fuel, such as hydrogen and/or carbon, from an inlet pipe 18.

An identical second porous electrode plate 19 is similarly supported by the housing plate 11, and together with the latter it defines an oxygen chamber 20 at the outside face of this electrode plate for receiving oxygen from an inlet pipe 21.

The inner faces of the electrode plates 16 and 19 extend in spaced, parallel, confronting relationship to each other.

A conventional gasket 22, which may be of tetrafluoroethylene or other suitable material, is engaged between the housing plate flanges 14 and 15 at the respective peripheries of the latter. Inside this gasket and between the confronting electrodes 16 and 19 the fuel cell defines an electrolyte chamber 23, which may be filled with an aqueous electrolyte, such as KOH, NaOH, or NaCl.

In accordance with the present invention, the fuel cell is provided with means for freezing the electrolyte around the periphery of the electrolyte chamber so as to provide a solidified seal 24 at the inside of the gasket 22 and between the housing plate flanges 14 and 15. As shown in the drawings, this cooling means preferably is constituted by cooling tubes 25 and 26 which are welded or soldered to the outside of the housing plate flanges 14 and 15 just radially inward from the gasket 22. Preferably, these cooling tubes extend circumferentially completely around the fuel cell. Suitable coolant is circulated through these tubes so as to maintain an electrolyte-freezing temperature in the space between flanges 14 and 15 just radially inward from the gasket 22. The cooling action may be started either before or after the electrolyte chamber 23 is filled with liquid electrolyte. Once the cell is filled with electrolyte, the cooling can be controlled to form a frozen electrolyte barrier of controlled thickness between the liquid electrolyte and the gasket 22.

It has been found that the frozen seal 24 so provided constitutes a highly effective seal which prevents leakage of the liquid electrolyte, even when the fuel cell operates at extremely high temperatures. Elaborate clamping devices are not required, in order to prevent leakage from the electrolyte chamber because the solidified seal does not distort or deteriorate. In addition, the frozen seal shields the conventional gasket 22 from the high temperature and chemical action of the liquid electrolyte, thereby extending the life of the gasket and also preventing the liquid electrolyte from contamination due to deterioration of the gasket material. Also, the frozen seal constitutes an excellent electrical insulator between the fuel cell electrodes. Moreover, limitations on the size of the fuel cell and its maximum operating temperature, which were imposed by the deficiencies of the gasketing material, are virtually eliminated.

If desired, the radial thickness of the frozen seal may be selectively varied for different conditions of use of the fuel cell, simply by controlling the degree of cooling provided by the cooling tubes 25 and 26. For example, it may be advantageous to freeze all or most of the electrolyte in the electrolyte chamber 23 when the fuel cell is subjected to appreciable acceleration forces, such as on a missile during launching. Then, after these forces have been removed, the electrolyte may be permitted to reliquify by reducing the cooling, with only enough of the electrolyte remaining solidified to provide a seal around the electrolyte chamber.

While a presently-preferred embodiment of the invention has been shown and described, it is to be understood that various modifications, omissions and refinements which depart from the disclosed embodiment may be adopted without departing from the spirit and scope of this invention.

I claim:

1. In a fuel cell having a pair of porous electrodes positioned in spaced, confronting relationship to one another, means for passing gaseous fuel against the outside face of one of said electrodes, means for passing oxygen against the outside face of the other of said electrodes, said fuel cell having an electrolyte chamber between the confronting inner faces of said electrodes, and gasket means extending around the periphery of said electrolyte chamber, the improvement in combination therewith which comprises cooling means on the fuel cell adjacent and contacting substantially the entire periphery of the electrolyte chamber for freezing the electrolyte thereat at a location just inward from said gasket means.

2. A fuel cell comprising a pair of spaced electrodes presenting inner faces which confront one another, means defining gas chambers at the respective outer faces of said electrodes, said fuel cell having an electrolyte chamber between said inner faces of the electrodes, a gasket extending around the periphery of said electrolyte chamber, and means for freezing a zone of the electrolyte, said freezing means being located at substantially the entire periphery of said electrolyte chamber inward from said gasket.

3. The fuel cell of claim 2, wherein said freezing means comprises cooling tube means attached to the fuel cell adjacent said gasket.

4. The fuel cell of claim 3, wherein said cooling tube means comprises tubes attached to the fuel cell just inward from said gasket and on opposite sides of the latter.

References Cited

UNITED STATES PATENTS 3,244,564   4/1966   Fox _____ 136—86

ALLEN B. CURTIS, *Primary Examiner.*

WINSTON A. DOUGLAS, *Examiner.*

B. OHLENDORF, A. SKAPARS,
*Assistant Examiners.*